(12) United States Patent
Abukawa et al.

(10) Patent No.: US 6,313,558 B1
(45) Date of Patent: Nov. 6, 2001

(54) ELECTRIC ROTARY MACHINE HAVING CONCENTRATED WINDING STATOR

(75) Inventors: Toshimi Abukawa; Kazuo Ohnishi; Yuji Takagai; Sachio Hatori; Kiyomichi Inoshita, all of Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/546,885

(22) Filed: Apr. 10, 2000

(51) Int. Cl.$^7$ ........................................ H02K 21/22
(52) U.S. Cl. ............................... 310/254; 310/216
(58) Field of Search ................... 310/216, 67 R, 310/254, 258, 259, 156; 29/596–598; 83/13, 34–36, 39

(56) References Cited

U.S. PATENT DOCUMENTS 3,860,843 * 1/1975 Kawasaki et al. ............ 310/67 R
5,923,110 * 7/1999 Zhao et al. ..................... 310/91
6,044,737 * 4/2000 Yao et al. ....................... 83/13

FOREIGN PATENT DOCUMENTS 04000247    1/1992 (JP).

* cited by examiner

Primary Examiner—Tran Nguyen
(74) Attorney, Agent, or Firm—Nilles & Nilles SC

(57) ABSTRACT

An electric rotary machine has a concentrated winding stator and a rotor facing the stator with a gap therebetween. The stator has M number of stator magnetic poles extending in the radial direction from an annular yoke, pole pieces each extending in the circumferential direction of the rotor from the tip end of each of the stator magnetic poles, and windings wound around the stator magnetic poles. The rotor having a permanent magnet with P number magnetic poles, wherein P:M=6n−2:6n, or P:M=6n+2:6n, where n is an integer not less than 2, and the figure of each of the pole pieces is so determined that a gap formed between the pole piece and the rotor is increased going toward the both ends of the pole piece.

4 Claims, 7 Drawing Sheets

ELECTRIC ROTARY MACHINE HAVING CONCENTRATED WINDING STATOR

BACKGROUND OF THE INVENTION

1. Field of the Invention

This invention relates to an electric rotary machine having a concentrated winding stator and, more particularly, relates to an electric rotary machine having a concentrated winding stator in which the cogging torque is reduced remarkably, the motor torque is high, the vibration and noise are small and the efficiency is high.

2. Description of the Prior Art

The cogging torque is in inverse proportion to the least common multiple of a pole number P of a permanent magnet rotor and a magnetic pole number M of a stator. The Japanese Patent Laid-Open No. 247/1992 discloses an electric motor having three pieces of a stator magnetic pole in a group A and three pieces of a stator magnetic pole in a group B, and six pieces of a stator magnetic pole in a group C. In the electric motor, the pole number P of the permanent magnet rotor is 16, and the pole number M of the stator is 12. Each pole piece of the stator magnetic pole in the group A has at both sides thereof, respectively, the same small projections extending in the circumferential direction of the rotor. Each pole piece of the stator magnetic pole in the group B has at the left side thereof a small projection extending in the circumferential direction of the rotor and at the right side thereof a large projection extending in the circumferential direction of the rotor. Each pole piece of the stator magnetic pole in the group C has at the right side thereof a small projections extending in the circumferential direction of the rotor and at the left side thereof a large projection extending in the circumferential direction of the rotor.

Further, the Japanese Patent Laid-Open No. 110468/1987 discloses a brushless motor in which P:M=6n±2:6n, where n is an integer not less than 2, P is the pole number of the permanent magnet rotor and M is the pole number of the stator.

However, in the electric motor shown in the Japanese Patent Laid-Open No. 247/1992, the winding coefficient indicating the effective application of the winding is small, such as 0.866 and the motor torque is small, because the pole number P of the permanent magnet rotor is 16, and the pole number M of the stator is 12. Further, the least common multiple of the pole number P of said permanent magnet rotor and the pole number M of said stator relating to the cogging torque is small, such as 48, so that the cogging torque cannot be reduced remarkably. That is, in case that the magnitude of the cogging torque of the motor which is similar in construction to the conventional motor is 1.0, and the figure of the pole piece is specified, the reduction effect of the cogging torque (a ratio of amplitude of the cogging torque) is as small as 0.35, or the peak to peak value of the cogging torque shown in FIG. 11A is only reduced by ⅓ as shown in FIG. 11B.

Further, the fundamental frequency f of the motor at a predetermined revolution is high (for example, f=(1800/60)×8=240 Hz at 1800 rpm) and the iron loss generated in the stator magnetic pole is large (it is proportion to $f^{1.5} \sim f^{1.7}$) because the pole number P of the permanent magnet rotor is large, such as 16, so that the efficiency of the motor is small.

Further, the motor torque is small, because the length of at least one projection of the pole piece is small in the group A, B or C, so that the quantity of the magnetic flux interlinking to the winding becomes small. Furthermore, there is such a defect that the winding inserted into the slot comes out so that the turn number of the winding, the occupation rate of the winding and the efficiency of the motor become small, because the length of at least one projection of the pole piece is small so that the slit width formed between the projections facing each other becomes large.

In the motor shown in the Japanese Patent Laid-Open No. 110468/1987, P:M=6n±2:6n, for example, P:M=14:12 or 10:12, so that the winding factor becomes large, such as 0.933 and the large motor torque is generated, where n is an integer not less than 2, P is the pole number of the permanent magnet rotor and M is the pole number of the stator.

Further, the least common multiple relating to the cogging torque is 84 in case that P:M=14:12, and is 60 in case that P:M=10:12. The cogging torque which is inverse proportion to the least common multiple is smaller than that in the motor shown in the Japanese Patent Laid-Open No. 247/1992. However, in case of the motor shown in the Japanese Patent Laid-Open No. 110468/1987 wherein P:M=14:12, the least common multiple is 84 so that the reduction effect (a ratio of amplitude of the cogging torque) is 0.57 (=1.0×48/84). In case that P:M=10:12, the least common multiple is 60 so that the reduction effect is 0.8 (=1.0×48/60). That is, the motor shown in the Japanese Patent Laid-Open No. 110468/1987 is lower in reduction effect and larger in fluctuation of the revolution, vibration and noise than that of the motor shown in the Japanese Patent Laid-Open No. 247/1992.

SUMMARY OF THE INVENTION

An object of the present invention is to provide an electric rotary machine having a concentrated winding stator which can solve the above problems.

Another object of the present invention is to provide an electric motor wherein P:M=6n±2:6n, where n is an integer not less than 2, P is the pole number of the permanent magnet rotor and M is the pole number of the stator, so that the winding factor becomes large and a predetermined motor torque can be obtained, and that the cogging torque is reduced remarkably, the torque fluctuation, vibration and noise are reduced and the productivity of the motor is enhanced by varying the figure of the tip end of the stator magnetic pole.

A further object of the present invention is to provide an electric motor wherein the higher harmonic components can be reduced, the iron loss is small, and a high efficiency can be obtained by making flat the distribution of the magnetic flux density in a gap between the rotor and the stator in the vicinity of the slit portion. Yet further object of the present invention is to provide an electric motor of a high power by increasing the turn number of the winding and the occupation rate of the winding.

Yet another object of the present invention is to provide an electric rotary machine comprising a concentrated winding stator and a rotor facing the stator with a gap therebetween, the stator having M number of stator magnetic poles extending in the radial direction from an annular yoke, pole pieces each extending in the peripheral direction from the tip end of each of the stator magnetic poles, and windings wound around the stator magnetic poles, the rotor having a permanent magnet with P number magnetic poles, wherein P:M=6n−2:6n, where n is an integer not less than 2, and the figure of each of the pole pieces is so determined that a gap formed between the pole piece and the rotor is increased going toward the both ends of the pole piece.

The other object of the present invention is to provide an electric rotary machine comprising a concentrated winding stator and a rotor facing the stator with a gap therebetween, the stator having M number of stator magnetic poles extending in the radial direction from an annular yoke, pole pieces each extending in the peripheral direction from the tip end of each of the stator magnetic poles, and windings wound around the stator magnetic poles, the rotor having a permanent magnet with P number magnetic poles, wherein P:M= 6n+2:6n, where n is an integer not less than 2, and the figure of each of said pole pieces is so determined that a gap formed between the pole piece and the rotor is increased going toward the both ends of the pole piece.

The ratio of a spread angle of the inclined flat portion to a spread angle of the central arc-shaped portion is in the range of 0.2~0.7.

Other objects and advantages will become apparent from the following description of the preferred embodiments taken in conjunction with the accompanying drawings.

DESCRIPTION OF THE PREFERRED EMBODIMENTS

Figure 1:
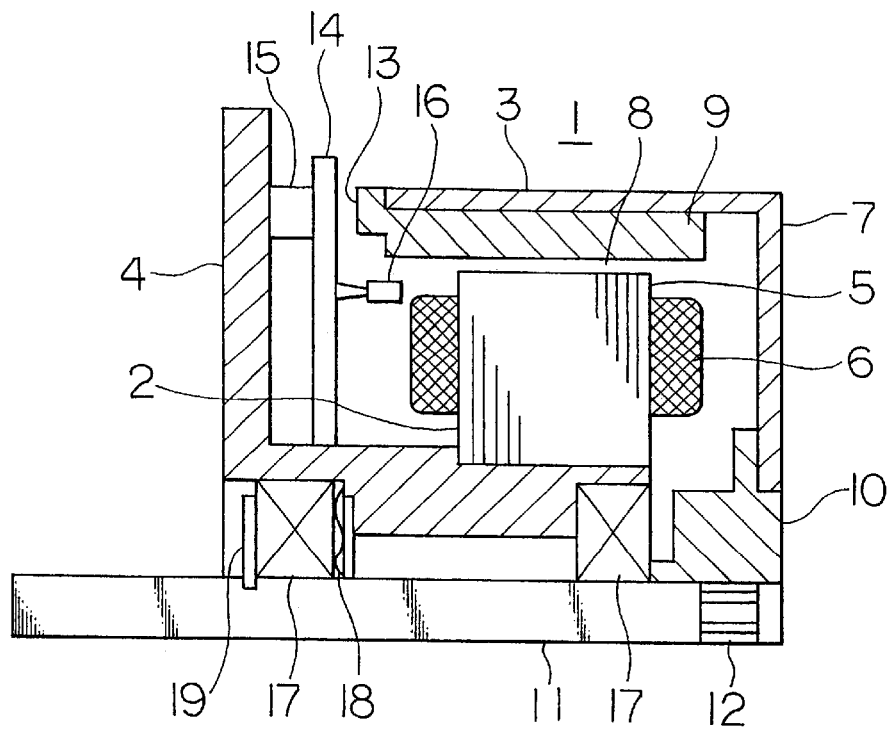
FIG. 1 is a vertically sectioned front view of an electric rotary machine of an embodiment according to the present invention with a portion cut away.
Figure 2:
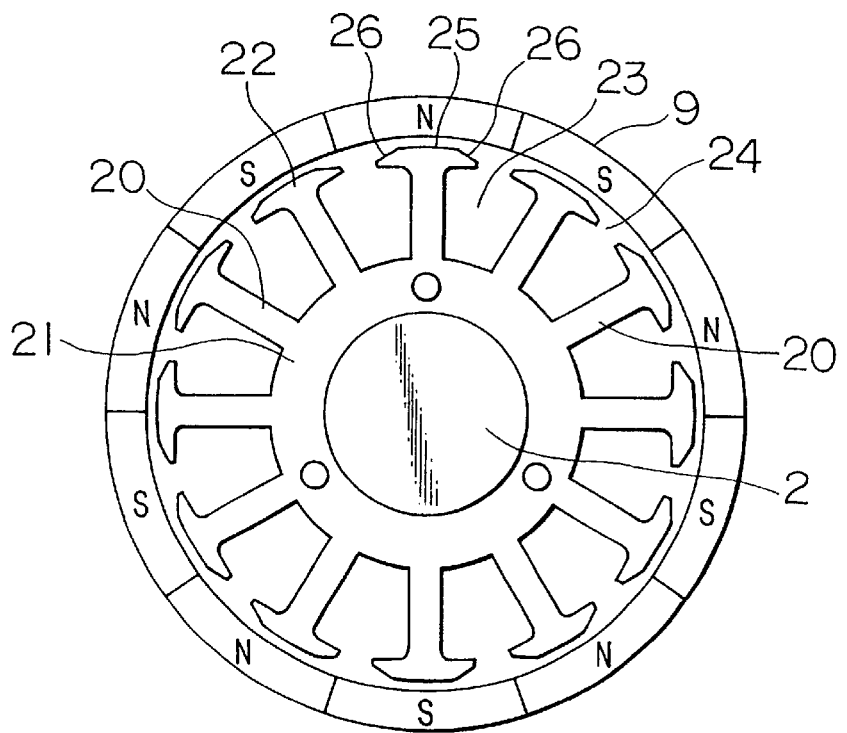
FIG. 2 is a side view of the electric rotary machine shown in FIG. 1.

FIG. 1 is a vertically sectioned front view of an electric rotary machine of an embodiment according to the present invention with a portion cut away. FIG. 2 is a side view of the electric rotary machine shown in FIG. 1.

The electric rotary machine shown in FIG. 1 comprises a stator 2, a rotor 3 and a cover 4. The stator 2 is composed of a stator iron core 5 mounted on the cover 4 and a concentrated stator winding 6. The rotor 3 comprises a cup-shaped holder 7 made of magnetic materials, and a ring-shaped plastic permanent magnet 9 made of ferrite series materials, magnetized to form ten poles, for example, and arranged at an inner peripheral surface portion of the holder 7. The holder 7 is fixed by fitting, caulking or the like to a bush 10 made of non-magnetic materials such as aluminum, brass or the like. The bush 10 is press fitted to a knurled portion 12 of a shaft 11. A projection 15 of the cover 4 is provided with a base plate 14 facing an axial end face 13 of the permanent magnet 9. On the base plate 14, three hole elements 16 for U, V, W phases are arranged to detect the magnetic pole of the permanent magnet 9. Ball bearings 17 are inserted between the shaft 11 of the rotor 3 and the cover 4. Stopper rings 19 are fixed to the shaft 11 and a leaf spring 18 is inserted between one of the stopper ring 19 and the ball bearing 17 in order to adjust the thrust in the axial direction.

FIG. 2 shows a side view of the stator and the rotor according to the present invention.

The permanent magnet 9 of the rotor 3 is magnetized to form ten poles.

The stator 2 comprises twelve stator magnetic poles 20 extending in the radial direction from an annular yoke 21, and pole pieces 22 each formed on each tip end of the stator magnetic poles 20. Each pole piece 22 has extended portions extending from both sides of each stator magnetic pole 20 in the rotary direction of the rotor 3. It is preferable that the length of the extended portion of the pole piece 22 of the left side is similar to that of the right side.

A slot 23 in the form of an egg-apple is formed between the adjacent stator magnetic poles 20, withinwhich the winding 6 is mounted.

A slit 24 is formed between the adjacent pole pieces 22 of the stator magnetic poles 20 throughwhich a nozzle for forming the winding 6 is passed. The number of the slits 24 is 12 and the widths of the slits 24 in the peripheral direction thereof are the same with one other.

Figure 3:
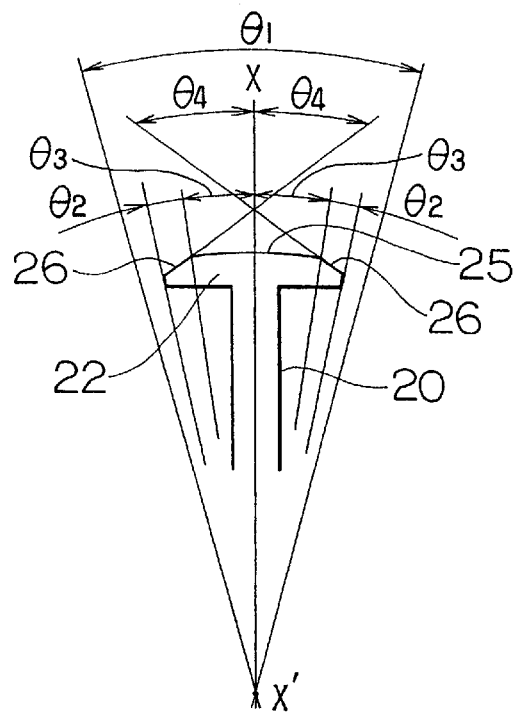
FIG. 3 is an enlarged front view of the pole piece of the stator magnetic pole portion shown in FIG. 2.

FIG. 3 is an enlarged front view of the pole piece 22 formed on the tip end of the stator magnetic pole 20. The pole piece 22 comprises a central arc-shaped portion 25 having an outer periphery of a curvature centering about X' on the shaft 11 and inclined flat portions 26 near the slits 24.

In the above embodiment, a slot pitch angle $\theta_1$ is 30°, because the number of the stator magnetic poles is 12. A spread angle $\theta_3$ between the end of the central arc-shaped portion 25 and a center line X–X' is 8.4° and a spread angle $\theta_2$ of the inclined flat portion 26 is 4°. Further, an inclined angle $\theta_4$ of the inclined flat portion 26 is 59°. A spread angle of the extended portion of the pole piece 22, that is $\theta_2+\theta_3$ is as large as 12.4°.

Figure 4:
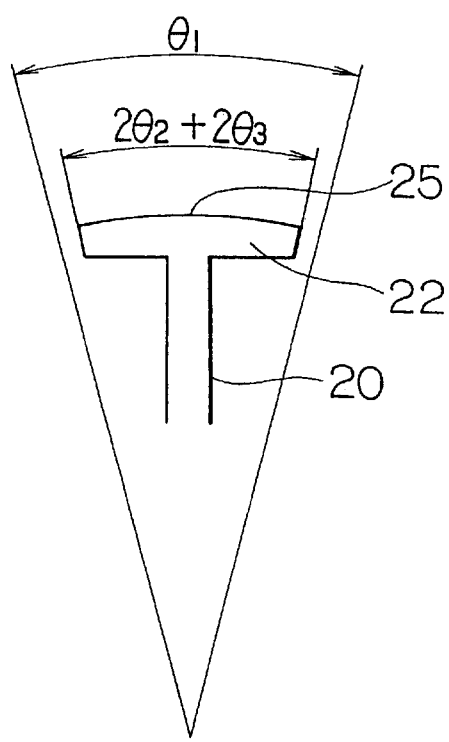
FIG. 4 shows a comparative example of the pole piece having no inclined flat portion.

FIG. 4 shows a comparative example of the pole piece having no inclined flat portion 26.

Figure 5:
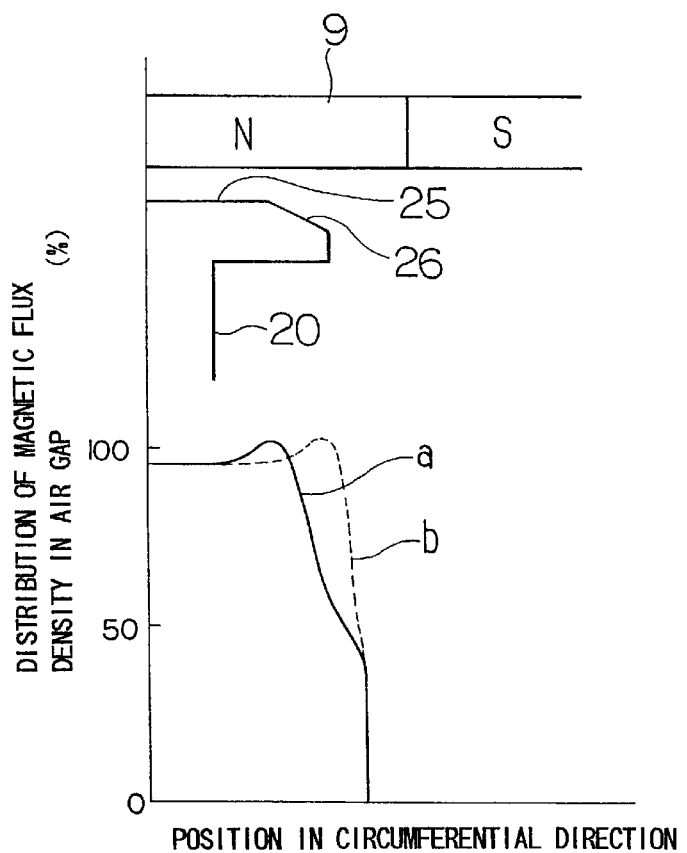
FIG. 5 shows a distribution of the magnetic flux density in the air gap of the electric rotary machine shown in FIG. 1.

FIG. 5 shows a distribution of the magnetic flux density in the air gap in the embodiment of the present invention shown in FIG. 3 and the comparative example shown in FIG.

4. In FIG. 5, the abscissa shows a position from the center of the air gap in the circumferential direction of the rotor, the ordinate shows the magnetic flux density in the air gap 8, and zero position is a position where the center of one pole of the permanent magnet 9 and the center line X–X' of the stator magnetic pole 20 coincide with each other. In the embodiment of the present invention wherein the inclined flat portions 26 are formed on the pole piece 22, the magnetic flux density at the central arc-shaped portion 25 is substantially flat, and the magnetic flux density in the air gap is decreased gradually, as shown by a solid line a in FIG. 5, because the air gap between the stator and the pole piece is increased gradually toward the slit 24. On the contrary thereto, in the motor wherein the pole piece 22 has no inclined flat portion as shown in FIG. 4, the air gap is increased abruptly near the slit 24, so that the magnetic flux density in the air gap is decreased abruptly as shown by a dotted line b. Accordingly, cogging torque T to be generated due to the change of the attraction force acting between the permanent magnet and the pole piece becomes large, because the variation rate of the energy of magnetic field shown in the following formula (1) is large.

$$T = \partial W / \partial \theta \tag{1}$$

Where, W is the energy of magnetic field and $\theta$ is the position in the circumferential direction.

On the contrary thereto, in the embodiment of the present invention, the variation rate of the energy of magnetic field is small and the cogging torque is reduced remarkably, because the tip end portion of the pole piece is formed of the inclined flat surface portion.

Figure 6:
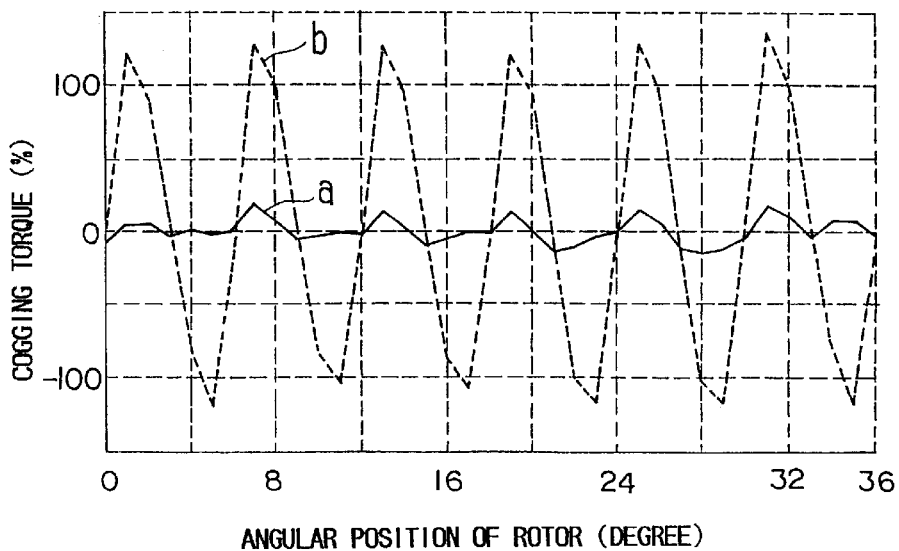
FIG. 6 is a graph showing the relation between the cogging torque and the angular position of rotor in an electric rotary machine according to the present invention wherein the pole number of permanent magnet is 10 and the magnetic pole number of stator is 12.

In FIG. 6, a solid line a is the cogging torque in the embodiment of the present invention shown in FIG. 3, a dotted line b is the cogging torque of the comparative example shown in FIG. 4, the ordinate shows the value of the cogging torque, and the abscissa shows the angular position of the permanent magnet of rotor (mechanical angle). The peak to peak value of the cogging torque of the pole piece in the comparative example shown in FIG. 4 which is the same in dimension with that of the present invention as shown in FIG. 3, but has no inclined flat portion, is 250% as shown by the dotted line b in FIG. 6. However, in the embodiment of the present invention, the peak to peak value is 30%, as shown by the solid line a. As stated above, in the present invention, the cogging torque is reduced by ⅛ substantially compared with the comparative example and the Japanese Patent Laid-Open No. 247/1992.

Figure 7:
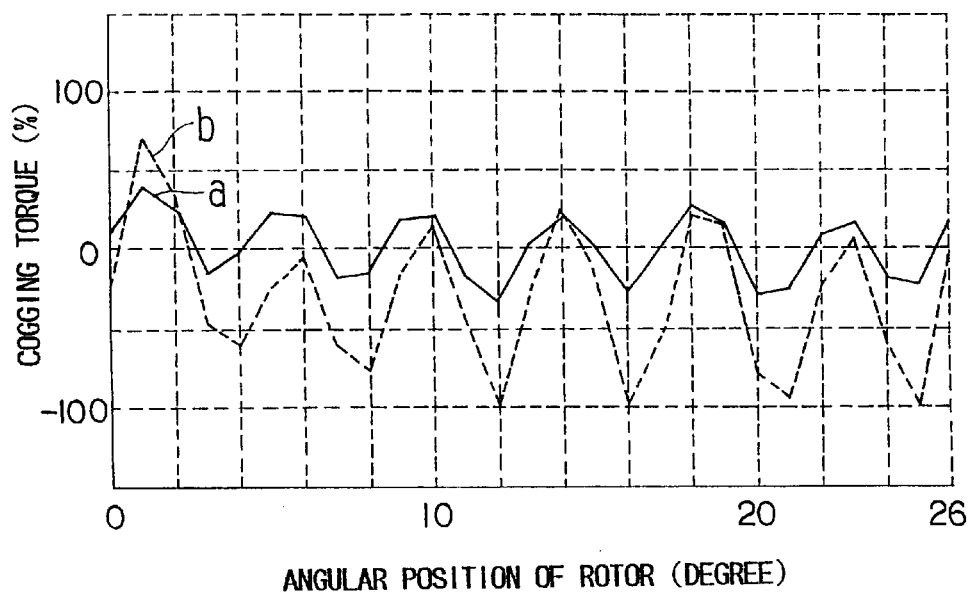
FIG. 7 is a graph showing the relation between the cogging torque and the angular position of rotor in an electric rotary machine according to the present invention wherein the pole number of permanent magnet is 14 and the magnetic pole number of stator is 12.

Further, in said embodiment, the pole number P of the permanent magnet is 10 and the magnetic pole number M of rotor is 12. In an embodiment wherein the pole number P of the permanent magnet is 14 and the magnetic pole number M is 12, the peak to peak value of the cogging torque of the comparative example of the pole piece having no inclined flat portion is 125% as shown by a dotted line b in FIG. 7, whereas in the pole piece of the present invention having the central arc-shaped portion and the inclined flat portions, the peak to peak value is 55% as shown by a solid line a. As stated above, in the embodiment according to the present invention, the cogging torque is reduced more than that shown in the Japanese Patent Laid-Open No. 110468/1987.

Figure 12:
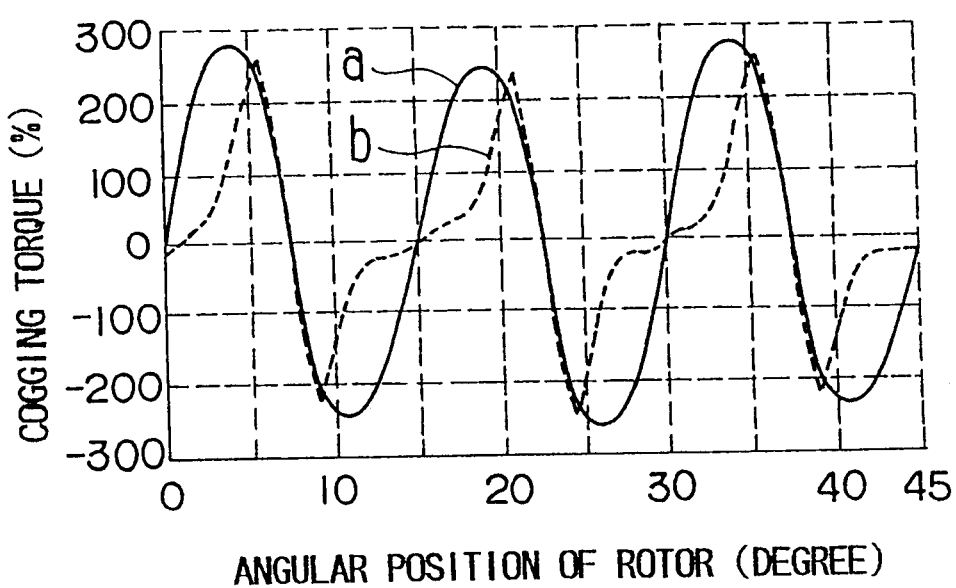
FIG. 12 is a graph showing the relation between the cogging torque and the angular position of rotor in the conventional electric rotary machine wherein the pole number of permanent magnet is 8 and the magnetic pole number of stator is 12.

Further, in an embodiment wherein the pole number P of the permanent magnet is 8 and the magnetic pole number M of rotor is 12, the peak to peak value of the cogging torque of the comparative example of the pole piece having no inclined flat portion is 480% as shown by a dotted line b in FIG. 12, whereas in the pole piece having the central arc-shaped portion and the inclined flat portions, the peak to peak value is 560% as shown by a solid line a. As stated above, in this embodiment, the cogging torque is increased. This means that the embodiment wherein the pole number P of the permanent magnet is 10 and the magnetic pole number M of rotor is 12 is the best for the reduction of the cogging torque.

Figure 8:
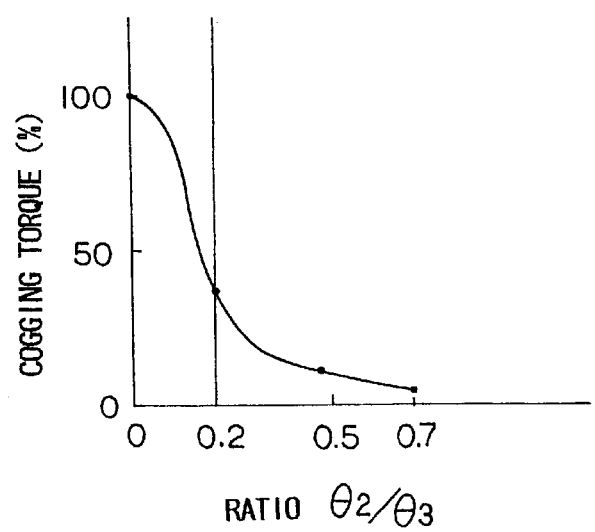
FIG. 8 is a graph showing the relation between the cogging torque and the figure of pole piece of rotor in an electric rotary machine according to the present invention wherein the pole number of permanent magnet is 10 and the magnetic pole number of stator is 12.

In the embodiment shown in FIG. 3, as stated above, the ratio of the spread angle $\theta_2$ of the inclined flat portion 26 to the spread angle $\theta_3$ between the end of the central arc-shaped portion 25 and the center line X–X' is 0.48. In the embodiment for reducing the cogging torque to not more than 30% compared with the comparative example wherein no inclined flat portion is provided and $\theta_2/\theta_3$ is zero, the $\theta_2/\theta_3$ becomes near to 0.2~0.7 as shown in FIG. 8. If the $\theta_2/\theta_3$ is increased more than 0.7, the quantity of the magnetic flux interlinking to the stator winding is reduced by 8% or more, and the winding factor becomes smaller than 0.866 in the conventional motor wherein P:M=16:12, so that the torque is lowered.

Accordingly, it is preferable that P:M=10:12, and $\theta_2/\theta_3$ is in the range of 0.2 to 0.7 in order to reduce the cogging torque remarkably and to obtain a predetermined motor torque.

Figure 9:
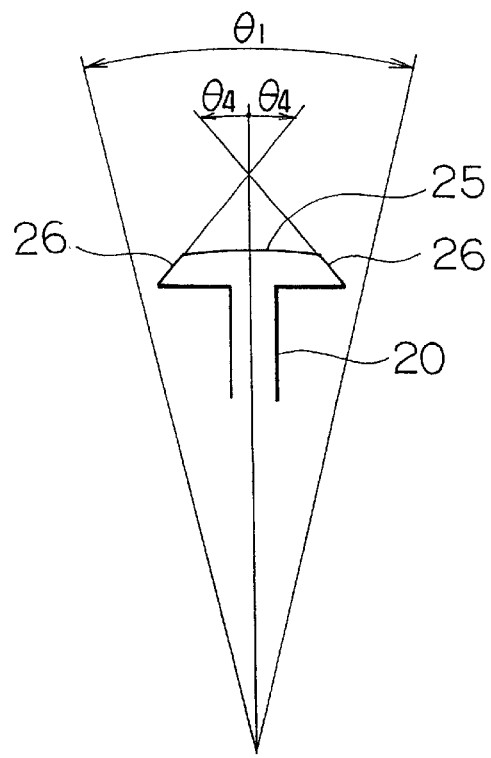
FIG. 9 is an enlarged front view of the pole piece of the stator magnetic pole portion according to another embodiment of the present invention.

Further, in the embodiment shown in FIG. 3, the inclined angle $\theta_4$ of the inclined flat portion is 59°. The cogging torque can be reduced further, if the inclined flat portion is an acute angle, that is, the inclined angle $\theta_4$ is smaller without changing the ratio of $\theta_2/\theta_3$ as shown in FIG. 9. The cogging torque can also be reduced by increasing merely the inclined angle $\theta_4$ (but up to 80°).

Figure 10:
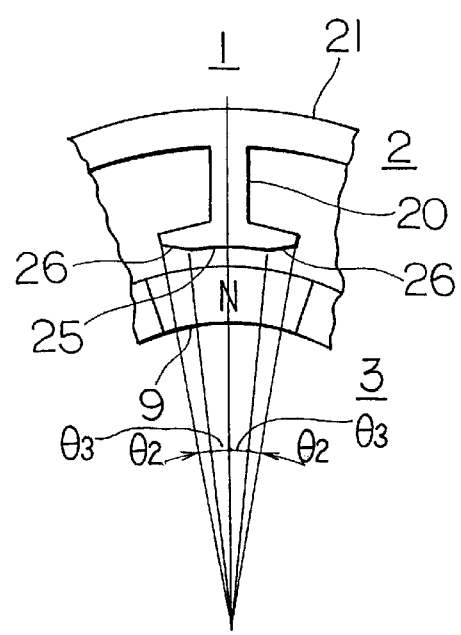
FIG. 10 is an enlarged front view of the pole piece of the stator magnetic pole portion according to a further embodiment of the present invention.
Figure 11A:
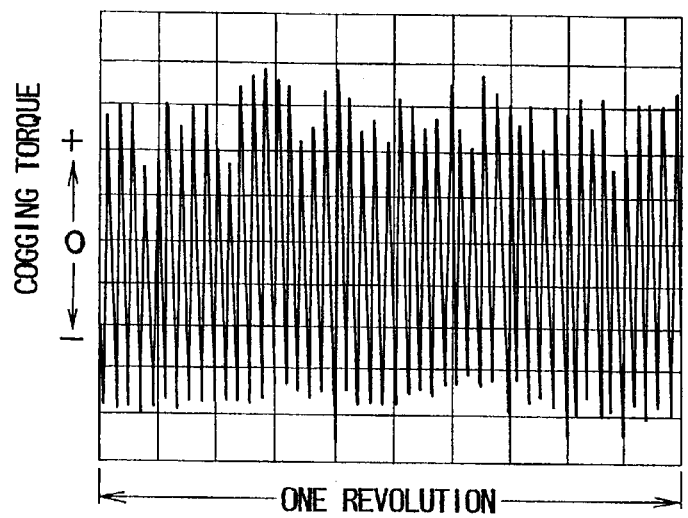
FIG. 11A is a graph showing the relation between the cogging torque and the rotation of rotor in the conventional electric rotary machine.
Figure 11B:
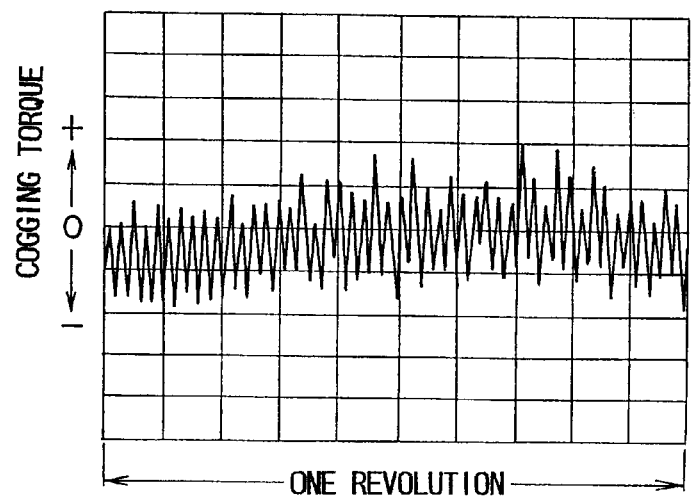
FIG. 11B is a graph showing the relation between the cogging torque and the rotation of rotor in the other conventional electric rotary machine.

FIG. 1 shows the electric rotary machine of outer rotor type. In case of an electric rotary machine of inner rotor type wherein the rotor 3 is arranged inside and the rotor 2 is arranged outside as shown in FIG. 10, and the ratio of $\theta_2/\theta_3$ is set in the range of 0.2 to 0.7, the cogging torque can be reduced remarkably if P:M=6n–2:6n or 10:12.

The present invention can be applied to not only the electric motor, but also the electric generator and the same effects can be obtained.

It goes without saying that as the permanent magnet a rubber magnet, segment type ferrite magnet, neodymium bond magnet, neodymium sintered ring magnet or the like can be used, selectively.

As stated above, according to the electric rotary machine of the present invention wherein P:M=6n±2:6n, and the tip end of the pole piece comprises the central arc-shaped portion and the left and right side inclined portions, the distribution of the magnetic flux density in the air gap at the inclined portion near the slit is equalized. Accordingly, the cogging torque which is in inverse proportion to the least common multiple of P and M can be reduced remarkably, so that an electric motor wherein the oscillating torque and the fluctuation of the rotation are small can be obtained. Further, the higher harmonic component can be reduced because said distribution of the magnetic flux density is equalized, so that the oscillation and noise are reduced.

In case that the pole number P of the permanent magnet is 10 and the magnetic pole number M of rotor is 12, if the ratio of the spread angle $\theta_2$ of the inclined flat portion 26 to the spread angle $\theta_3$ of the central arc-shaped portion 25 is in the range of 0.2~0.7, the cogging torque can be reduce by ⅓ to ¹⁄₁₅ compared with the comparative example having no inclined flat portion.

Especially, the reduction effect of the cogging torque in the case wherein P:M=10:12, or P is smaller than M is larger than that in the case wherein P:M=14:12, or P is larger than M. Further, in the case that P:M=10:12, the fundamental frequency of the motor becomes small and the iron loss can be reduced, so that the motor of high efficiency and high power can be obtained.

Furthermore, if the inclined portion and the central arc-shaped portion of the pole piece of the stator magnetic pole are formed in the same size, the rotation piling of the stator iron plate (90° or 180°) can be carried out, so that the plastic deformation becomes small, and a stator of high precision in dimension usable in the reversible rotation rotary machine can be obtained.

Because the right and left side projections of the pole piece are large, the area of the slot 23 becomes large and the turn number of the winding can be increased, so that the occupation rate of the winding becomes large, and a rotary machine of high efficiency and high power can be obtained.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. An electric rotary machine comprising a concentrated winding stator and a rotor facing the stator with a gap therebetween, the stator having M number of stator magnetic poles extending in the radial direction from an annular yoke, pole pieces each extending in the circumferential direction of the rotor from the tip end of each of the stator magnetic poles, and windings wound around the stator magnetic poles, the rotor having a permanent magnet with P number magnetic poles, wherein P:M=6n−2:6n, where n is an integer not less than 2, and the figure of each of the pole pieces is so determined that a gap formed between the pole piece and the rotor is increased going toward the both ends of the pole piece, and wherein the pole piece consists of a central, arc-shaped portion and right and left inclined flat portions.

2. The electric rotary machine according to claim 1, wherein the ratio of a spread angle of the inclined flat portion to a spread angle of the central arc-shaped portion is in the range of 0.2~0.7.

3. An electric rotary machine comprising a concentrated winding stator and a rotor facing the stator with a gap therebetween, the stator having M number of stator magnetic poles extending in the radial direction from an annular yoke, pole pieces each extending in the circumferential direction of the rotor from the tip end of each of the stator magnetic poles, and windings wound around the stator magnetic poles, and the rotor having a permanent magnet with P number magnetic poles, wherein P:M=6n+2:6n, where n is an integer not less than 2, and the figure of each of the pole pieces is so determined that a gap formed between the pole pieces and the rotor is increased going toward the both ends of the pole piece, and wherein the pole piece consists of a central arc-shaped portion and right and left inclined flat portions.

4. The electric rotary machine according to claim 3, wherein the ratio of a spread angle of the inclined flat portion to a spread angle of the central arc-shaped portion is in the range of 0.2~0.7.

* * * * *